Patented Nov. 24, 1931

1,833,527

UNITED STATES PATENT OFFICE

FRANK F. LINDSTAEDT, OF OAKLAND, CALIFORNIA, ASSIGNOR TO HERCULES GLUE COMPANY, OF SAN FRANCISCO, CALIFORNIA, A CORPORATION OF CALIFORNIA

ADHESIVE

No Drawing. Application filed December 20, 1927. Serial No. 241,458.

This invention relates to an adhesive, especially an adhesive made from vegetable-protein-containing meal, such as peanut, pea, bean, or like meals.

Such an adhesive is used extensively for the manufacture of wooden articles, and my object is to produce an adhesive which is highly waterproof and will set quickly, and at the same time possesses increased dispersion, so that a smaller quantity of adhesive will be required for a given purpose.

The present adhesive is prepared by first mixing together in dry form a vegetable-protein-containing meal, such as peanut, pea, or bean meal, and calcium hydrate. These should be in proportions of about 180 pounds of meal to about 15 pounds of calcium hydrate. Water at about 90° Fahrenheit is added, and the mixture agitated for about 5 minutes. The next step is to add to this mixture a solution consisting of about 4 pounds of caustic soda and 3 pounds of potassium permanganate dissolved in 50 pounds of water. After thoroughly mixing this solution with the mixture of meal and lime, I add about 100 pounds of silicate soda, and stir the mixture for about 10 minutes, and thereafter add about 350 pounds of water. To this material, 6 pounds of a specially prepared liquid waterproofing agent is added. This waterproofing agent preferably consists of ⅔ carbon bi-sulphide and ⅓ metallic soap. The metallic soaps best suited are zinc resinate, lead oleate, or calcium linoleate. The function of the metallic soaps is to act as a fixing agent by reducing the evaporative rate of the carbon bi-sulphide; and they also tend to eliminate foaming of the mixture.

The introduction into the mixture of caustic soda and potassium permanganate together, rather than separately, is important, in that a finer stage of subdivision of the vegetable protein will result. The practical value of this is that less adhesive is required for a given purpose. Whereas, with prior protein adhesives, about 35 pounds is required for 1,000 square feet of three-ply veneer, with the present adhesives 20 pounds will suffice.

Such adhesives as set forth herein will set quickly, and the period of setting can be still further reduced by introducing a quantity of casein into the dry mixture of meal and lime, equal to about 3% to 5% of the latter.

With the waterproofing agent employed herein, a highly waterproof adhesive is produced. For example, a three-ply veneer glued with the present mixture will show from one-third to two-thirds of its dry strength after being soaked in water for twenty-four hours.

Having thus described my invention, what I claim as new and desire to secure by Letters Patent is:

1. An adhesive comprising a mixture of vegetable-protein-containing meal, lime, caustic soda, potassium permanganate and silicate of soda and a waterproofing agent, the latter including carbon bi-sulphide and a metallic soap for a fixing agent for said carbon bi-sulphide.

2. The process of making an adhesive, which comprises agitating a mixture of a vegetable-protein-containing meal, calcium hydrate, and water, mixing therewith a solution of caustic soda and of potassium permanganate, stirring therewith silicate of soda, diluting and adding thereto a mixture of carbon bi-sulphide and metallic soap.

3. The process of making an adhesive, which comprises mixing together in direct form a vegetable-protein-containing meal and calcium hydrate, agitating the resulting mixture with warm water, mixing therewith an aqueous solution of caustic soda and potassium permanganate, agitating therewith silicate of soda, diluting and mixing therewith a mixture of carbon bi-sulphide and metallic soap.

4. The process of making an adhesive, which comprises mixing together in direct form about 180 pounds of a vegetable-protein-containing meal and about 15 pounds of calcium hydrate in direct form, stirring the same in water at about 90° F., mixing therewith a solution of about 4 pounds of caustic soda and about 3 pounds of potassium permanganate dissolved in about 50 pounds of water, stirring therewith about 100 pounds of silicate of soda, diluting with about 350 pounds of water, and mixing therewith about 6 pounds of a mixture consisting of two-thirds carbon bi-sulphide and one-third metallic soap.

5. An adhesive comprising a mixture of about 180 pounds of vegetable-protein-containing meal, about 15 pounds of calcium hydrate, about 4 pounds of caustic soda, about 3 pounds of potassium permanganate, about 100 pounds of silicate of soda, about 4 pounds of carbon bi-sulphide, about 2 pounds of metallic soap, and water.

FRANK F. LINDSTAEDT.